(12) United States Patent
Umehara et al.

(10) Patent No.: US 8,222,783 B2
(45) Date of Patent: Jul. 17, 2012

(54) VIBRATION MOTOR HOLDING STRUCTURE AND VIBRATION MOTOR

(75) Inventors: Mikio Umehara, Tottori-ken (JP); Kazuaki Sato, Tottori (JP); Daichi Kadowaki, Tottori-ken (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 0 days.

(21) Appl. No.: 13/197,536

(22) Filed: Aug. 3, 2011

(65) Prior Publication Data

US 2011/0285228 A1 Nov. 24, 2011

Related U.S. Application Data

(63) Continuation of application No. 12/151,354, filed on May 6, 2008, now Pat. No. 8,013,486.

(30) Foreign Application Priority Data

May 7, 2007 (JP) ................................. 2007-124572
May 14, 2007 (JP) ................................. 2007-137988

(51) Int. Cl.
*H02K 7/06* (2006.01)
(52) U.S. Cl. ........................................... 310/81; 310/91
(58) Field of Classification Search .................... 310/81, 310/89, 91
See application file for complete search history.

(56) References Cited

U.S. PATENT DOCUMENTS

| 5,986,367 | A | 11/1999 | Tsuzaki et al. |
| 6,081,055 | A | 6/2000 | Narusawa |
| 6,133,657 | A | 10/2000 | Semenik et al. |
| 6,954,015 | B2 * | 10/2005 | Segawa ............................ 310/71 |
| 7,023,114 | B2 * | 4/2006 | Takagi et al. .................... 310/81 |
| 7,709,983 | B2 * | 5/2010 | Umehara et al. ................ 310/81 |
| 7,825,555 | B2 * | 11/2010 | Uchiumi et al. ................ 310/81 |
| 2005/0206257 | A1 | 9/2005 | Takagi et al. |
| 2007/0241626 | A1 | 10/2007 | Suzuki et al. |
| 2007/0253178 | A1 | 11/2007 | Uchiumi et al. |
| 2008/0309180 | A1 | 12/2008 | Suzuki et al. |

FOREIGN PATENT DOCUMENTS

| JP | 09-271155 | 10/1997 |
| JP | 09-290214 | 11/1997 |
| JP | 10-336950 | 12/1998 |
| JP | 11-114496 | 4/1999 |
| JP | 11-234943 | 8/1999 |
| JP | 2003-143799 | 5/2003 |
| JP | 2005-198366 | 7/2005 |
| JP | 2005-295752 | 10/2005 |
| JP | 2005-312282 | 11/2005 |
| JP | 2006-25555 | 1/2006 |
| JP | 2006-212608 | 8/2006 |
| JP | 2006-304491 | 11/2006 |
| WO | WO 2005/064770 | * 7/2005 |

* cited by examiner

*Primary Examiner* — Nguyen N Hanh
(74) *Attorney, Agent, or Firm* — McDermott Will & Emery LLP

(57) ABSTRACT

There is provided a holding structure to hold a vibration motor on a circuit board with a sufficient holding strength using an inexpensive and simple means such as caulking and bonding and a vibration motor held on a circuit board using the holding structure. The holding structure having a holder clamps a vibration motor body having an eccentric weight at an end of the rotation shaft around the outer periphery from the outside and supports the vibration motor at the lower part.

17 Claims, 7 Drawing Sheets

VIBRATION MOTOR HOLDING STRUCTURE AND VIBRATION MOTOR

CROSS-REFERENCE TO RELATED APPLICATIONS

This application is a continuation of U.S. patent application Ser. No. 12/151,354, filed May 6, 2008, which claims priority to Japanese Patent Application No. 2007-124572, filed May 9, 2007, and Japanese Patent Application No. 2007-137988, filed May 24, 2007, all of which are expressly incorporated herein by reference and made a part hereof.

FEDERALLY SPONSORED RESEARCH OR DEVELOPMENT

Not Applicable.

TECHNICAL FIELD

The present invention relates to a holding structure for vibration motors installed in portable communication devices such as mobile phones and PHSs and game machines to generate body sensory vibration and a vibration motor provided with the holding structure.

BACKGROUND OF THE INVENTION

Portable communication devices inform the wearer of an incoming call by ring tones or body sensory vibration generated by the rotation of an eccentric weight of a built-in vibration motor. The modes are switched as necessary. Some of game machines let the operator sense vibration generated by the vibration motor in the machine in the course of games for more fun.

Such kind of vibration motor is secured to a circuit board in the device/machine and generates and transmits vibration to the device/machine housing, whereby the wearer/operator of the communication device/game machine senses the vibration. Such an example is described in Japanese Patent Application Laid-open No. 2005-312282, wherein a built-in vibration motor is mounted on a circuit board in such a suspended manner that a motor case is clamped by a mountain frame radially from the outside around the upper half of the motor case and folded legs at the bottom of the mounting frame are bonded along the edges of a cutout formed in the circuit board.

In another example described in Japanese Patent Application Laid-open No. H11-234943, a vibration motor is mounted on a circuit board in such a manner that a cylindrical motor body is retained by a metal holder frame, an eccentric weight is fixed to one end of a motor shaft, creamed solder applied to the circuit board is melted in a heating furnace to secure the entire structure of the motor to the circuit board.

The above mounting methods do not ensure that the vibration motor is held by the mounting frame securely enough for the motor vibration generated by the rotation of the eccentric weight or for accidental drop of the device. Therefore, some countermeasures are provided such as spot welding between the mounting frame and motor case.

However, spot welding requires an expensive spot welding apparatus and produces spot residue or flash, which has to be removed. When the residue or flash remains, it may adversely affect the circuitry operation or motor rotation. Particularly, if the motor case is deformed by spot welding, it may cause a problem with the motor rotation.

On the other hand, there is an increasing demand for downsizing, flattening, and light-weight in recent portable communication devices and game machines. The vibration motors for generating body sensory vibration are not exceptional among many circuit parts and functional parts mounted in a limited space in the device. They are also required to be smaller. However, their downsizing has a limitation since they have to generate the necessary vibration.

It has therefore been desired to generate vibration having a large body sensory effect using the same vibration motor.

SUMMARY OF THE INVENTION

The present invention has been made in light of the above problem and it is an object of the present invention to provide a vibration motor holding structure comprising a holder providing sufficient holding strength using an inexpensive and simple method such as caulking and bonding without installing expensive equipment such as a spot welding apparatus and a vibration motor held on a circuit board using the holding structure.

It is another object of the present invention to provide a vibration motor holding structure generating vibration having a large body sensory effect and a vibration motor having the holding structure.

In order to achieve the above object, according to a first aspect of the present invention, the holder clamps a vibration motor having an eccentric weight at an end of a rotation shaft around the outer periphery from the outside and supports the vibration motor at the lower part.

The holder of the present invention is preferably formed by pressing a sheet of steel plate and further folding predetermined parts at predetermined positions into a shape to clamp the motor around the outer periphery from the outside and support the motor at the lower part.

The holder of the present invention preferably has wing-like legs extending outward in parallel to the motor shaft at the radially outer edges of the vibration motor.

A vibration motor using the holding structure comprising the holder having the above wing-like legs is secured on a circuit board with the wing-like legs fixed at the side edges of a cutout of the circuit board by reflow soldering.

According to a second aspect of the present invention, a tilting means for mounting the vibration motor on a circuit board in a tilted manner in the longitudinal direction of the rotation axis is provided to the vibration motor holding structure or to the circuit board.

In the above structure, the tilting means is comprised of at least one pair of wing-like legs provided to the holder as the vibration motor holding structure, the wing-like legs tilting in relation to the axis line of the vibration motor and extending outward at the radially outer edges of the vibration motor being fixed at the side edges of a cutout of the circuit board to hold the vibration motor on the circuit board.

It is preferable that the wing-like legs are formed by pressing a steel plate and folding predetermined parts it at predetermined positions.

A vibration motor using the holding structure comprising the holder having the above wing-like legs is secured on a circuit board with the wing-like legs fixed at the side edges of a cutout of the circuit board by reflow soldering.

In the present invention, a vibration motor having an eccentric weight at an end of the rotation shaft is clamped around the outer periphery from the outside and further supported at the lower part, securely holding the entire vibration motor. Therefore, the vibration motor is not inconveniently removed from the circuit board while the motor generates vibration or when the portable communication device is accidentally dropped, preventing the circuitry operation or function of the portable communication device from being disabled.

A vibration motor body is secured and held on the holder by a simple and inexpensive means such as caulking and bonding without expensive equipment or means such as spot welding.

A holder for holding the vibration motor body on a circuit board can easily be formed by pressing and folding a sheet of steel plate, realizing low manufacturing cost.

Furthermore, in the present invention, the vibration motor is mounted on a circuit board in a tilted manner in the axial direction to increase the magnitude of vibration in the vibration motor shaft direction. A high level of body sensory vibration can be obtained using a vibration motor of the same standard under the same condition. Consequently, a vibration motor generating a necessary level of body sensory vibration can be downsized, which is advantageous in providing portable communication devices and reducing machine size, weight, and thickness.

BRIEF DESCRIPTION OF THE DRAWINGS

The above object and other advantages of the present invention will become more apparent by describing in detail the preferred embodiment of the present invention with reference to the attached drawings, in which.

DETAILED DESCRIPTION

The present invention will now be described hereafter with reference to the drawings.

Figure 1:
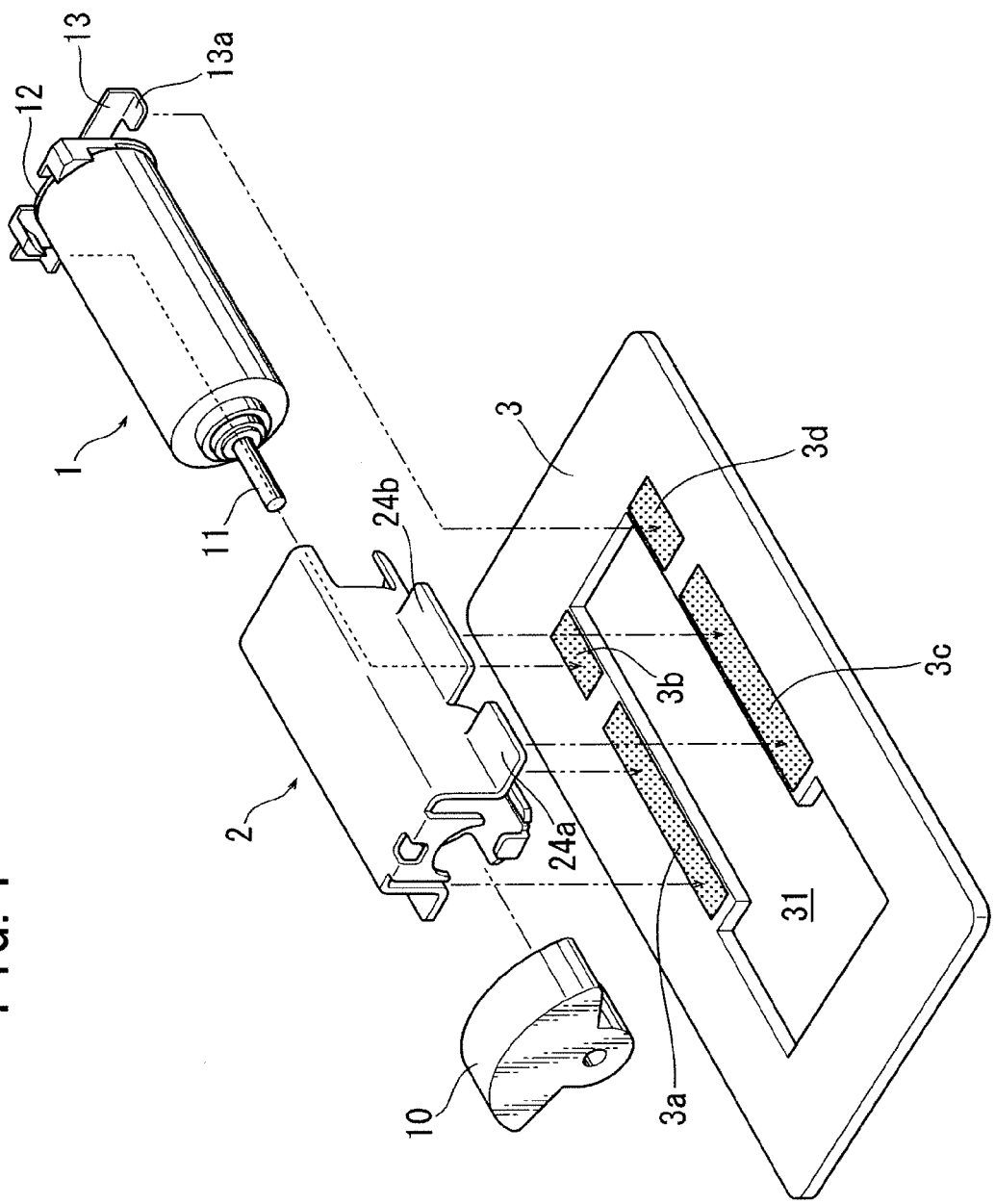
FIG. 1 is a perspective view for explaining how a vibrating motor is mounted on a circuit board using a holder as a holding structure of the present invention.

FIG. 1 is an exploded perspective view of a structure to hold on a circuit board a vibration motor used for generating vibration in a portable communication device.

FIG. 1 shows a vibration motor body 1 covered with a cylindrical motor frame, an eccentric weight 10 to be fixed to a rotation shaft 11 of the vibration motor body 1 for generating vibration, and a holder 2 designed to clamp the vibration motor body 1 around its outer periphery. Entirely clamped by the holder 2 from the outside with the eccentric weight 10 fixed thereto, the vibration motor body 1 is inserted in a cutout 31 of a circuit board 3. A resin bracket 12 is attached to the vibration motor body 1 at its rear end (the top right in the figure). A conductive external terminal 13 is fixed to the bracket 12. Brush fixed terminals of the vibration motor body 1 are electrically connected to the external terminal 13.

Figure 2:
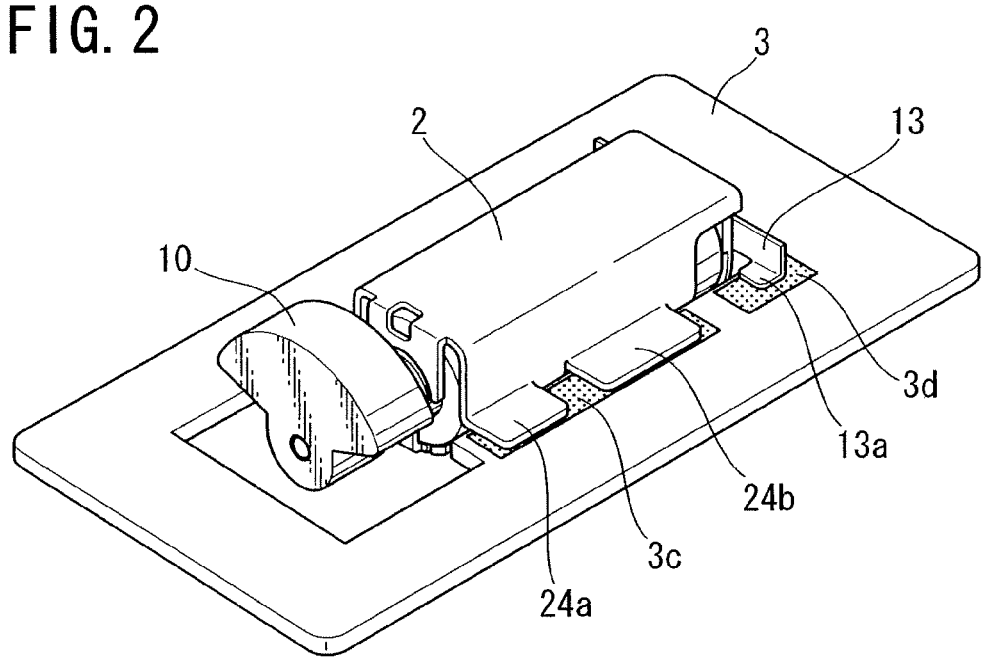
FIG. 2 is a perspective view showing a vibration motor mounted on a circuit board according to an embodiment of the present invention.

FIG. 2 shows the vibration motor body 1 mounted on the circuit board 3 using the holder 2 of the present invention.

Figure 3:
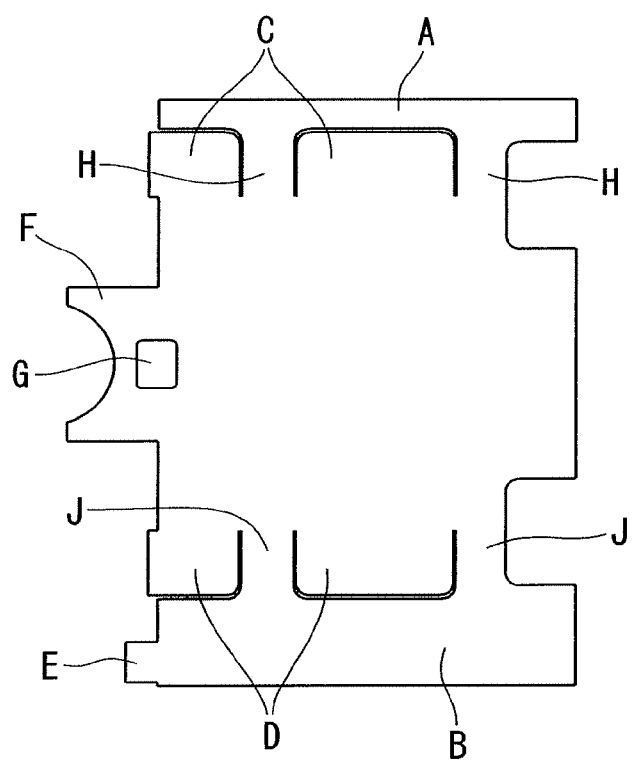
FIG. 3 is a plan view of a holder material from which the holding structure shown in FIG. 2 is manufactured.
Figure 4:
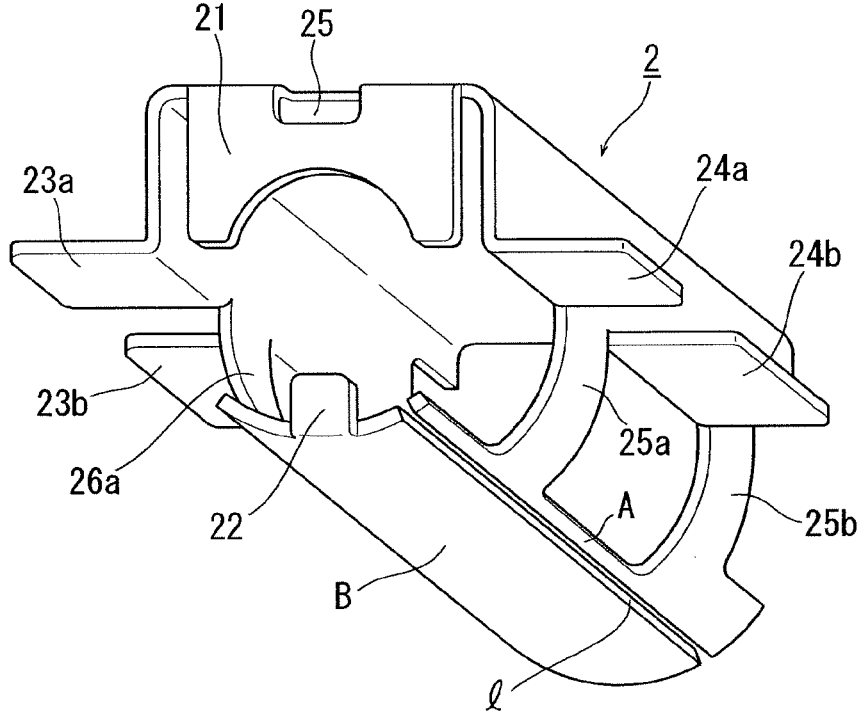
FIG. 4 is a perspective view of an embodiment of the holder of the present invention.

The holder 2 is formed by pressing a steel plate (such as a rolled carbon steel plate SPCC) having a thickness of 0.1 mm to 0.3 mm and plated for a good affinity to solder into a shape shown in FIG. 3, which is folded by a folding machine (not shown) to create a three-dimensional shape shown in FIG. 4. The holder 2 has an inner diameter slightly smaller than the outer diameter of the motor frame of the vibration motor body 1. Holder materials having tin-based plating are advantageous in cost. However, gold-plating is preferable where soldering property has a priority. When the holder material is nickel silver, no plating is required because it has a good affinity to solder.

After the holder material shown in FIG. 3 is folded by a folding machine into a shape shown in FIG. 4, an upper edge A and a lower edge B of the material closely face each other, one projection F of the material forms a vertical piece 21 of the holder 2, and the other small projection E forms an upright piece 22 of the holder 2. The vertical piece 21 and upright piece 22 serve as stoppers for the vibration motor body 1 when it is inserted in the holder 2. Cut patterns C and D of the holder material form wing-like legs 23*a*, 23*b* and 24*a*, 24*b* of the holder 2 after folded. Opening G forms an opening 25 of the holder 2. Parts H and J of the material form straps 25*a*, 25*b*, and 26*b*. The end positions of the cut patterns C and D can be changed to alter the height of the wing-like legs 23*a*, 23*b*, 24*a*, and 24*b* of the holder 2, whereby the mounting position of the vibration motor body 1 on the circuit board 3 can be adjusted. The opening 25 is used for adjustment in folding but may be eliminated.

Mounting of the vibration motor on a circuit board according to the present invention will be described hereafter with reference to FIG. 1.

The assembled vibration motor body 1 is inserted in the holder 2 shown in FIG. 4 from its one end (the rear end in FIG. 4) until the front end of the vibration motor body 1 makes contact with the vertical piece 21 and the upright piece 22. When getting close contact with each other, the entire holder 2 is caulked using a caulking machine (not shown). Then, the eccentric weight 10 is caulked to the rotation shaft 11 protruding from the front end of the holder 2. As a result of caulking, the upper edge A and the lower edge B of the holder 2 are in close contact with each other and serve as a resilient clamping piece, whereby the vibration motor body 1 and the holder 2 are locked together to form a vibration motor unit. In this case, the locking of the holder 2 to the vibration motor body 1 is enhanced by applying an adhesive to the inner surface of the holder 2 entirely or partially.

The upper edge A and the lower edge B of the holder 2 are designed to be slightly separated immediately after being processed, but make close contact with each other when the holder 2 is caulked after the vibration motor body 1 is inserted, holding the vibration motor body 1 in a more reliable manner with increased holding strength.

On the other hand, the circuit board 3 on which circuit wirings are previously printed is prepared and creamed solder layers 3a, 3b, 3c, and 3d are applied at predetermined positions along the side edges of a cutout 31 formed at a predetermined position of the circuit board 3 (see FIG. 1).

The vibration motor unit prepared as described above is inserted in the cutout 31 of the circuit board 3 with the rotation shaft 11 parallel to the circuit board 3 and secured on the circuit board 3. At the time, the vibration motor unit is positioned on the circuit board 3 so that the wing-like legs 23a and 23b are placed on the solder layer 3a, the wing-like legs 24a and 24b are placed on the solder layer 3c, and the horizontal legs 13a and 13a of the external terminal 13 at the end of the vibration motor body 1 are placed on the creamed solder layers 3b and 3d.

The vibration motor unit supported by the wing-like legs 23a, 23b, 24a, and 24b on the circuit board 3 is transferred together with the circuit board 3 into a reflow furnace (not shown) where the vibration motor unit is heated at stepwise elevated temperatures, causing the creamed solder layers to melt. Leaving the reflow furnace, the vibration motor unit is secured to the circuit board 3.

In this way, the vibration motor having the eccentric weight 10 is mounted on the circuit board 3.

Figure 5:
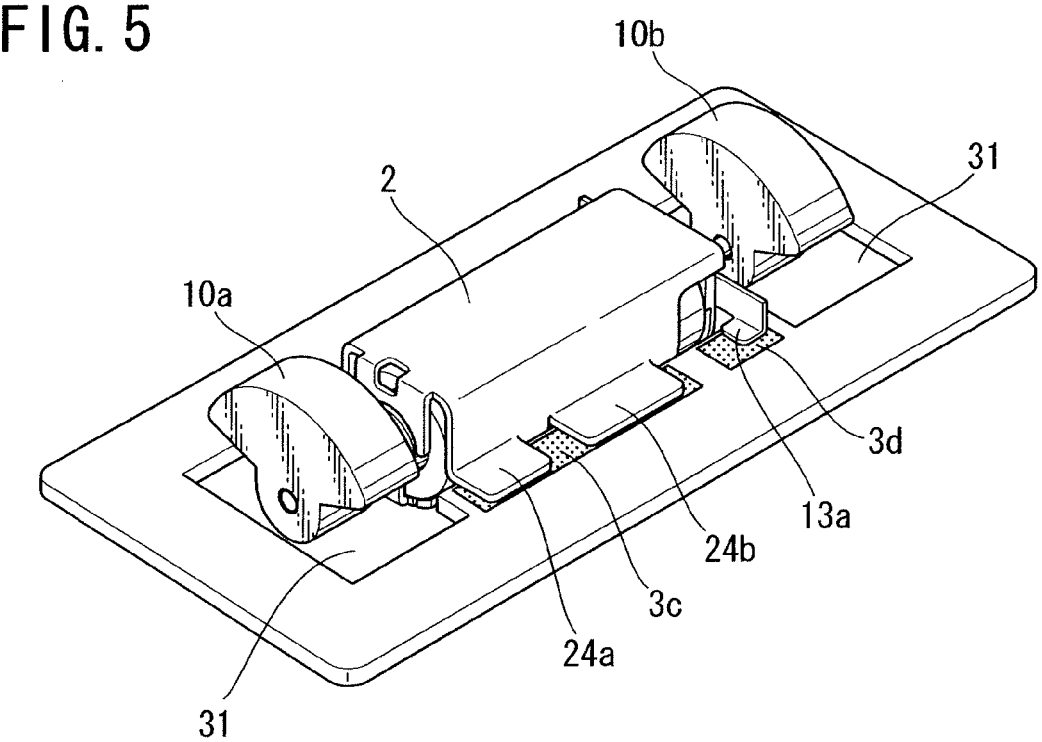
FIG. 5 is an illustration showing a vibration motor mounted on a circuit board according to another embodiment of the present invention.

FIG. 5 shows a vibration motor with two eccentric weights of the preset invention.

The relationship between the vibration motor body 1 and the holder 2 in this embodiment is the same as in the embodiment having a single eccentric weight shown in FIG. 2 and an explanation thereof is omitted. The same components as in FIG. 2 are referred to by the same reference numerals. In this embodiment, two eccentric weights 10a and 10b are used.

The vibration motor having two eccentric weights realizes a high level of the magnitude of vibration even if the vibration motor is small, allowing the mounting board to have a reduced thickness and contributing to reduction in the thickness of communication devices.

In the above embodiments, the vibration motor body 1 has a cylindrical outer motor frame, but the outer motor frame may be rectangular. The number of the wing-like legs 23a, 23b, 24a, and 24b and straps 25a, 25b, and 26a provided to the holder may be changed depending on how the holder material is pressed.

Further embodiments of the vibration motor holding structure of the present invention will be described hereafter.

Figure 6:
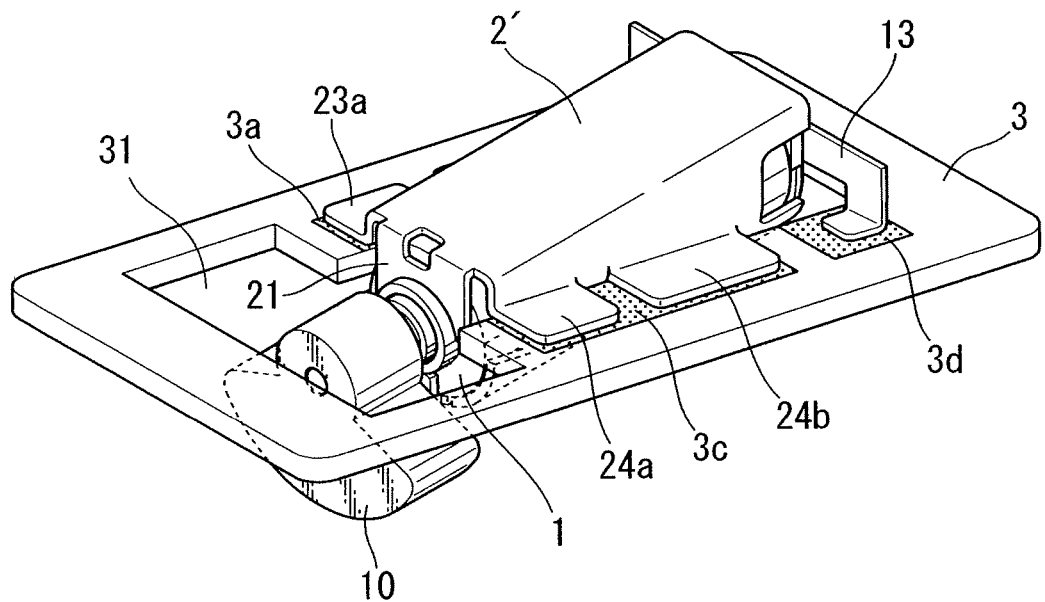
FIG. 6 is also an illustration showing a vibration motor mounted on a circuit board according to a further embodiment of the present invention.

FIG. 6 is a perspective view of a vibration motor having an embodiment of the holding structure of the present invention and mounted on a circuit board.

Figure 7:
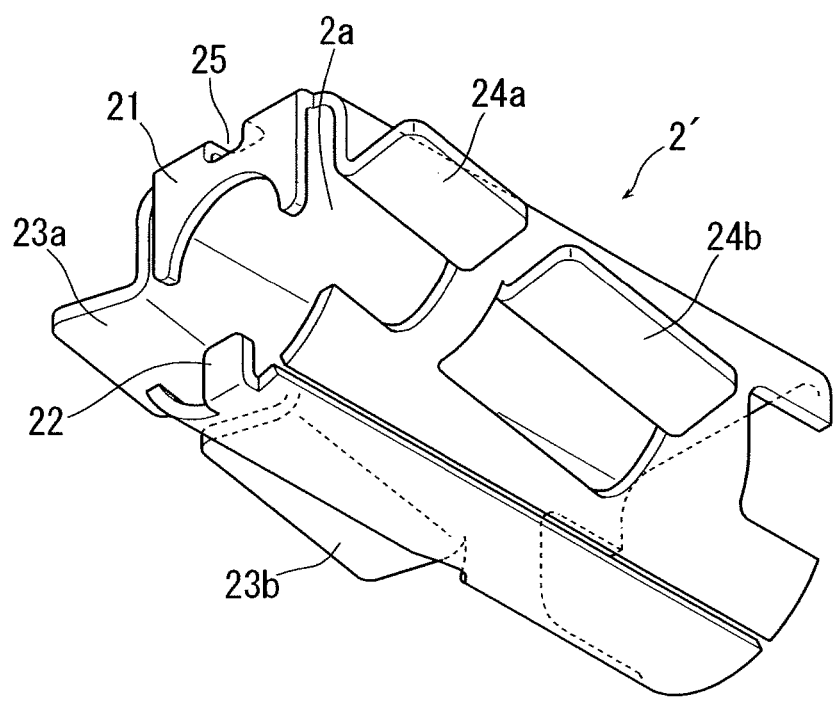
FIG. 7 is a perspective view of a holder as the holding structure shown in FIG. 6.

The vibration motor body 1 and the metal holder clamping the vibration motor 1 around the outer periphery have nearly the same structures as shown in FIGS. 1 to 4 and, therefore, the same components are not explained here and referred to by the same reference numerals in a holder of FIG. 7.

Figure 8:
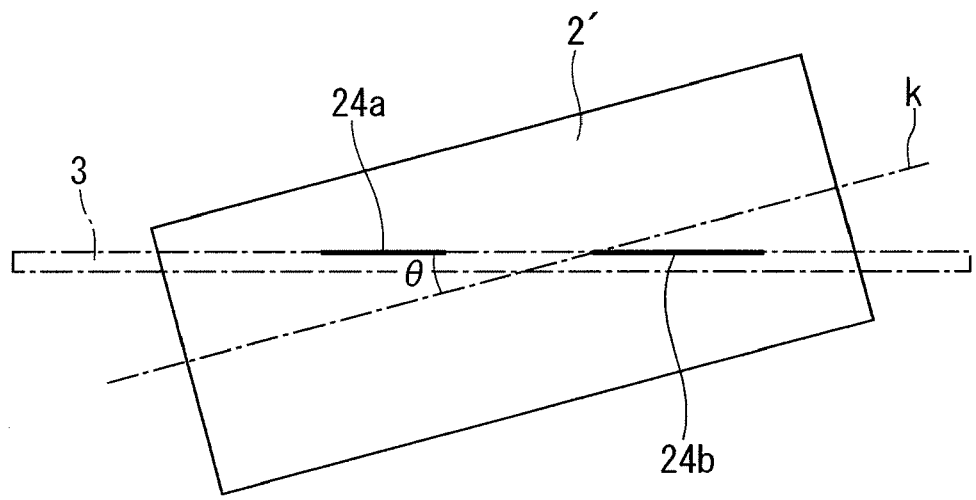
FIG. 8 is an illustration explaining how a holder is mounted in a tilted manner.

In this embodiment, a holder 2' is partly different from the holder 2 shown in FIG. 4. As shown in FIG. 8, a plane including the wing-like legs 24a and 24b is tilted in relation to the longitudinal axis line k of the holder 2' by an angle θ so that the holder 2' dives in the front end (the left in the figure).

Figure 9:
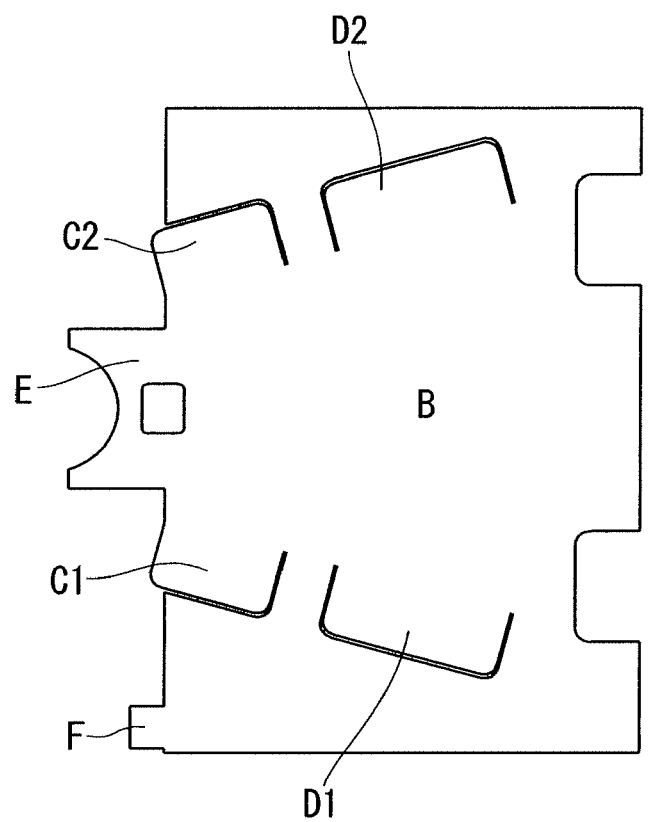
FIG. 9 is a plan view of a holder material from which the holder shown in FIG. 7 is manufactured.

The holder 2' is formed by pressing a steel plate (such as a rolled carbon steel plate SPCC) having a thickness of 0.1 mm to 0.3 mm and plated for a good affinity to solder into a shape shown in FIG. 9, which is folded by a folding machine (not shown) to create a three-dimensional shape shown in FIG. 7.

Center part B of the holder material forms a top flat part 2a of the holder 2' (see FIG. 7). Lateral parts C1 and C2 form wing-like legs 23a and 24a, respectively and lateral parts D1 and D2 form wing-like legs 23b and 24b, respectively. Protrusions E and F are bent to form retention pieces 21 and 22, respectively.

Holder materials having tin-based plating are advantageous in terms of cost. However, gold-plating is preferable where soldering property has a priority. When the holder material is nickel silver, no plating is required because it has a good affinity to solder.

Referring back to FIG. 6, the circuit board 3 is a printed circuit (not shown). The cutout 31 is formed at a position where no wiring for the printed circuit is provided to accept the vibration motor unit. Creamed solder layers 3a, 3c, and 3d are applied at predetermined positions along the side edges of the cutout 31. The position of the creamed solder layer 3a corresponds to the positions of the wing-like legs 23a and 23b of the holder 2'. The position of the creamed solder layer 3c corresponds to the positions of the wing-like legs 24a and 24b of the holder 2'. The position of the creamed solder layer 3d corresponds to the position of an external terminal 13 at the rear end of the vibration motor body 1.

Mounting of the vibration motor unit on the circuit board will be described hereafter.

Referring to FIG. 7, the cylindrical vibration motor body 1 is inserted in the holder 2' previously folded into the three-dimensional shape from the back on the right until the front end of the vibration motor body 1 makes close contact with the retention pieces 21 and 22 at the front end of the holder 2'. When getting close contact with each other, the holder 2' is caulked. If the holder 2' has an inner diameter slightly smaller than the outer diameter of the motor frame of the vibration motor body 1, the holder 2' can provides a resilient clamping force. The holder 2' may be locked to the vibration motor body 1 by some means other than caulking such as bonding and welding. Then, an eccentric weight 10 is press-fitted on the rotation shaft protruding from the front end of the holder 2'.

The vibration motor unit prepared as described above is inserted in the cutout 31 of the circuit board 3 on which circuits are pre-printed and positioned on the circuit board 3 so that the wing-like legs 23a and 23b of the holder 2' are placed on the creamed solder layer 3a, the wing-like legs 24a and 24b, on the creamed solder layer 3c and the external terminal 13, on the creamed solder layer 3d. Consequently, the vibration motor unit is tilted with the front end (the eccentric weight end) down.

The vibration motor unit thus placed on the circuit board 3 with the front end down as shown in FIG. 6 is conveyer-transferred into a reflow furnace (not shown) where the vibration motor unit is heated at stepwise elevated temperatures, causing the creamed solder layers 3a, 3c, and 3d to melt. Leaving the reflow furnace, the circuit board is cooled down and the vibration motor unit is securely mounted on the circuit board 3.

The following experiments were conducted to measure the magnitude of vibration of the vibration motor mounted on a circuit board in a tilted manner.

Figure 10:
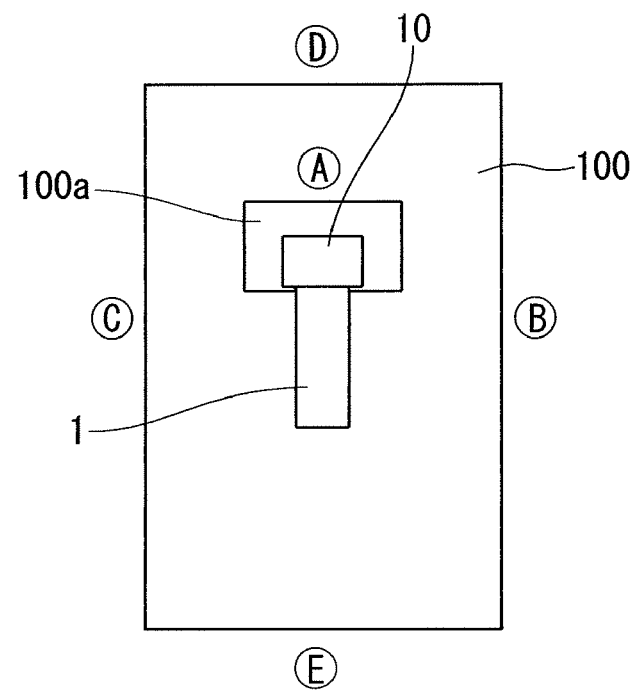
FIG. 10 is a schematic view of an apparatus for measuring the magnitude of vibration generated by the vibration motor of the present invention.

As shown in FIG. 10, a hard resin block 100 of approximately 100 g (corresponding to the average weight of a portable cellular phone) is partly cut out to form an opening 100a. A vibration motor unit is immobilized on the resin block 100 with an eccentric weight 10 accepted in the opening 100a. The magnitude of vibration generated by the vibration motor was measured at five positions A, B, C, D, and E shown in FIG. 10 using a uniaxial vibration detectable acceleration sensor. In Experiment 1, the vibration motor unit was immobilized with the rotation shaft parallel to the plane of the resin block 100 (prior art). In Experiment 2, the vibration motor unit was immobilized on the resin block 100 in a tilted manner with the eccentric weight end down (the present invention). The tilting angle of the vibration motor unit in Experiment 2 was 15 degrees. The following results were obtained.

|  | Positions | | | | |
| --- | --- | --- | --- | --- | --- |
|  | A | B | C | D | E |
| Experiment 1 | 0.808 | 0.606 | 0.559 | 0.086 | 0.063 |
| Experiment 2 | 0.672 | 0.559 | 0.552 | 0.181 | 0.152 |

(unit: N (newton))

Figure 11:
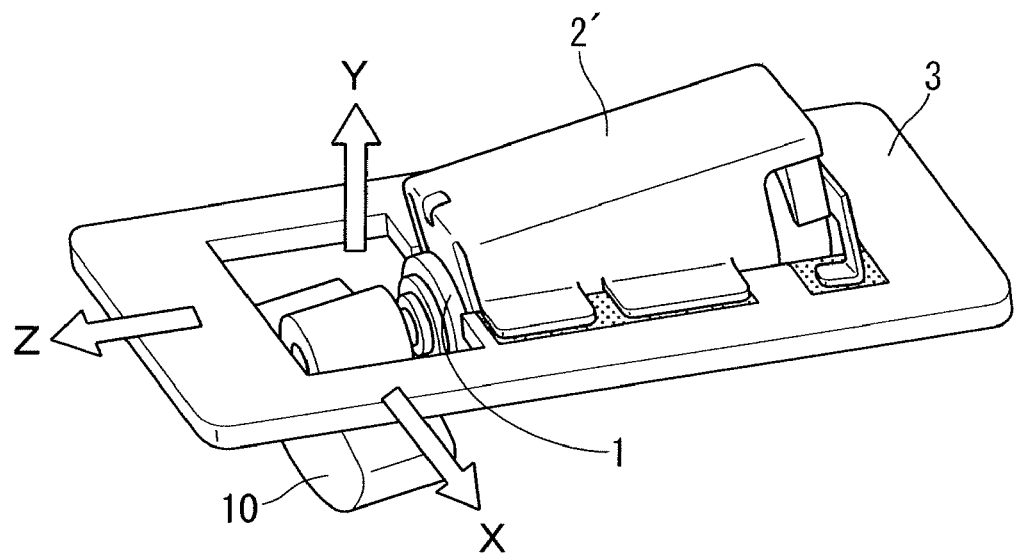
FIG. 11 is a perspective view explaining the direction of vibration generated by the vibration motor of the present invention.

The above results reveal that the magnitude of vibration is more than two times larger at the positions D and E when the vibration motor is tilted compared with the prior art of no-tilting manner. In other words, in FIG. 11, the magnitudes of vibration in the directions X and Y are nearly unchanged; however, the magnitude of vibration in the direction Z of the present invention is significantly increased. Consequently, when the vibration motor is installed in a device, the device provides a much higher level of body sensory vibration than the prior one.

Figure 12:
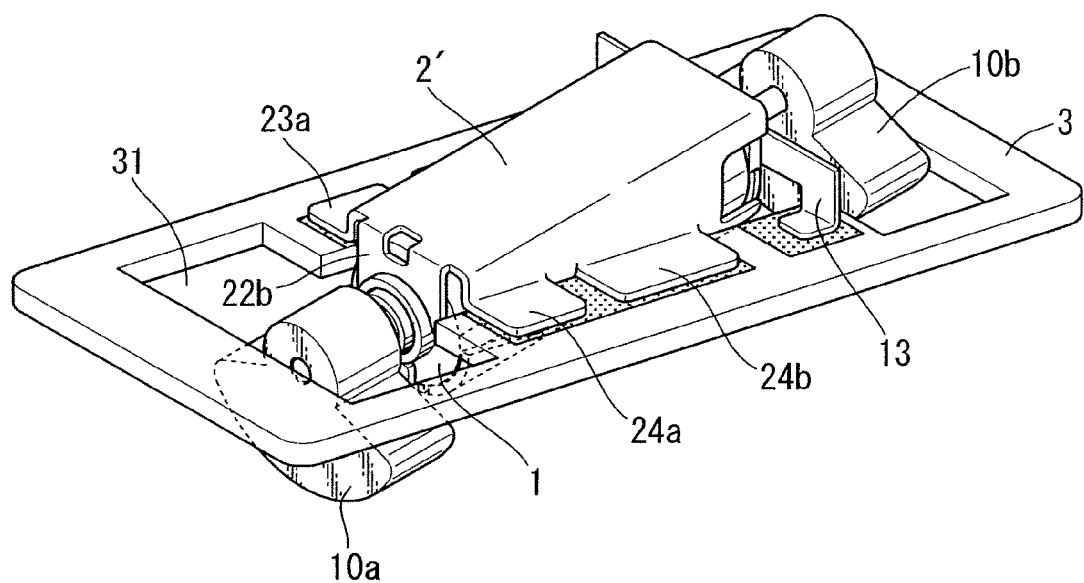
FIG. 12 is a perspective view showing a vibration motor mounted on a circuit board according to a further embodiment of the present invention.

FIG. 12 shows an embodiment in which the holding structure of the present invention is applied to a vibration motor with two eccentric weights.

In this embodiment, eccentric weights 10a and 10b are attached to the vibration motor body 1 at both ends of the rotation shaft and the vibration motor body 1 is mounted on the circuit board 3 in a tilted manner with the eccentric weight 10a end down. The other configuration is the same as in the embodiment shown in FIG. 6 and the same components are referred to by the same reference numerals.

Experiments showed that the magnitude of vibration in the direction Z or in the longitudinal direction of the rotation shaft of the vibration motor is increased also in this embodiment. Furthermore, a vibration motor with two eccentric weights generates a large magnitude of vibration at any position and particularly in the direction Z than a vibration motor with a single eccentric weight when they have the same size and the same number of motor rotation. In addition, it was also confirmed that a vibration motor unit tilted with the eccentric weight 10b end down also has vibration increased in the direction Z.

In the above embodiment, the vibration motor body has a cylindrical motor frame. However, the motor frame may be rectangular. The horizontal positions, heights, and the tilting angle of the wing-like legs provided to the holder may be determined from the viewpoint of design.

In the above embodiment, the wing-like legs of the holder is used to tilt the vibration motor body. However, a tilting means may be provided on the circuit board. In other words, the means for tilting the vibration motor in relation to the circuit board is not restricted to the wing-like legs of the holder.

What is claimed is:

1. A vibration motor holding structure for holding a vibration motor with at least one eccentric weight at either end of a rotation shaft of the vibration motor, comprising:
a flat portion configured to be in contact with a top face of a motor barrel,
the motor barrel having a first lateral side and a second lateral side,
a first part downward extending from the flat portion at the first lateral side of the motor barrel bottom portion of the motor barrel,
a second part downward extending from the flat portion at the second lateral side of the motor barrel,
wherein the vibration motor holding structure is configured to hold an outer peripheral surface of the motor barrel elastically from an outside with the flat portion contacting the top face of the motor barrel, the first part holding the outer peripheral surface on the first lateral side while supporting the bottom portion of the motor barrel, and the second part holding the outer peripheral surface on the second lateral side of the motor barrel; and
wherein a distal edge of the first part of the vibration motor holding structure closely opposes a distal edge of the second part of the vibration motor holding structure.

2. The vibration motor holding structure according to claim 1, wherein said holder has at least one set of wing-like legs on either lateral side of the motor barrel, said wing-like legs extend radially outward of the motor barrel and in parallel with an axis of the motor barrel.

3. The vibration motor holding structure according to claim 2, wherein said wing-like legs are fixed to a circuit board at side edges of a cutout of the circuit board to hold said vibration motor on said circuit board by soldering.

4. A vibration motor holding structure according to claim 2, wherein said wing-like legs are fixed to a circuit board at the side edges of a cutout of the circuit board to hold said vibration motor on said circuit board by reflow soldering.

5. A vibration motor holding structure according to claim 1, further comprising a tilting means for mounting said vibration motor on the circuit board in a tilted manner in the longitudinal direction of the motor.

6. A vibration motor held on a circuit board with the vibration motor holding structure according to claim 1.

7. A vibration motor for use in a portable communication device or a game machine held on a circuit board with the vibration motor holding structure according to claim 1.

8. A vibration motor held on a circuit board with the vibration motor holding structure according to claim 1, wherein a tilting means for mounting the vibration motor on the circuit board in a tilted manner with respect to the longitudinal direction of the motor is provided on the vibration motor holding structure.

9. A vibration motor holding structure according to claim 1, wherein said vibration motor has eccentric weights at both ends of said rotation shaft.

10. A vibration motor holding structure comprising:
a holder, for holding a vibration motor with at least one eccentric weight at either end of a rotation shaft of the vibration motor, the vibration motor having a motor barrel with a first lateral side, a second lateral side, and a bottom portion disposed between the first lateral side and the second lateral side,
the holder having a flat portion configured to be in contact with a top face of the motor barrel, the holder also having first part and a second part, the first part extending downward from a flat portion at the first lateral side of the motor barrel onto the bottom portion of the motor barrel, and the second part extending downward from the flat portion at the second lateral side of the motor barrel,
wherein the holder is configured to hold an outer peripheral surface of the motor barrel elastically from an outside with the flat portion contacting with the top face of the motor barrel, the first part holding the outer peripheral surface on the first lateral side while supporting the bottom portion of the motor barrel, and the second part holding the outer peripheral surface on the second lateral side of the motor barrel; and wherein a distal edge of the first part of the vibration motor holding structure closely opposes a distal edge of the second part of the vibration motor holding structure.

11. The vibration motor holding structure of claim 10, wherein the holder has at least one set of wing-like legs on either lateral side of the motor barrel, the wing-like legs extending radially outward of the motor barrel and in parallel with an axis of the motor barrel.

12. The vibration motor holding structure of claim 10, wherein a distal end of the first part of the holder is proximate a distal end of the second part of the holder.

13. The vibration motor holding structure of claim 10, further comprising a tilting means for mounting said vibration motor on the circuit board in a tilted manner in the longitudinal direction of the motor.

14. A vibration motor holding structure according to claim 10, wherein said vibration motor has eccentric weights at both ends of said rotation shaft.

15. A vibration motor holding structure for holding a vibration motor having at least one eccentric weight at either end of a rotation shaft of the vibration motor, the vibration motor also having a motor barrel with a first lateral side, a second lateral side generally opposite the first lateral side, a bottom portion disposed between the first lateral side and the second lateral side, and a top side disposed between the first lateral side and the second lateral side and generally opposite the bottom portion, the holding structure comprising:

a flat portion configured to be in contact with the top side of the motor barrel;

a first support extending about a periphery of the motor barrel from the first lateral side of the motor barrel to the second lateral side of the motor barrel and contacting the bottom portion of the motor barrel to support the motor barrel;

a second support extending about a periphery of the of the motor barrel on the second lateral side of the motor barrel;

wherein at least one of the first support and the second support having at least one set of wing-like legs extending radially outward of the motor barrel and in parallel with an axis of the motor barrel; and wherein a distal edge of the first support of the vibration motor holding structure closely opposes a distal edge of the second support of the vibration motor holding structure.

16. The vibration motor holding structure of claim 15, wherein a distal end of the first support is disposed proximate a distal end of the second support.

17. The vibration motor holding structure of claim 16, wherein the distal end of the first support and the distal end of the second support are disposed on the second lateral side of the motor barrel.

* * * * *